US008969724B2

(12) United States Patent
Tatsumi et al.

(10) Patent No.: US 8,969,724 B2
(45) Date of Patent: Mar. 3, 2015

(54) ELASTIC SIGNAL TRANSMISSION CABLE

(75) Inventors: Shunji Tatsumi, Tokyo (JP); Yasunori Yuuki, Tokyo (JP); Hiroyuki Makino, Tokyo (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 59 days.

(21) Appl. No.: 12/920,187

(22) PCT Filed: Jun. 25, 2008

(86) PCT No.: PCT/JP2008/061585
§ 371 (c)(1),
(2), (4) Date: Aug. 30, 2010

(87) PCT Pub. No.: WO2009/157070
PCT Pub. Date: Dec. 30, 2009

(65) Prior Publication Data

US 2011/0088925 A1 Apr. 21, 2011

(51) Int. Cl.
*H01B 7/06* (2006.01)
*G02B 6/44* (2006.01)
*H01B 11/00* (2006.01)

(52) U.S. Cl.
CPC . *H01B 7/06* (2013.01); *H01B 11/00* (2013.01)
USPC 174/69; 174/110 R; 174/113 C; 174/113 AS; 385/100

(58) Field of Classification Search
CPC ........................................................ H01B 7/06
USPC .... 174/260, 69, 117 M, 117 F, 110 R, 113 C, 174/113 AS; 385/100
See application file for complete search history.

(56) References Cited

U.S. PATENT DOCUMENTS 2,573,439 A * 10/1951 Henning ......................... 174/69
3,299,375 A * 1/1967 Thompson .................... 333/243
3,453,374 A * 7/1969 Natwick ......................... 174/69
(Continued)

FOREIGN PATENT DOCUMENTS

EP 1 596 401 A1 11/2005
JP 60-119013 6/1985
(Continued)

OTHER PUBLICATIONS

International Search Report from the Japanese Patent Office for International Application No. PCT/JP2008/061585 (Mail date Aug. 26, 2008).

(Continued)

*Primary Examiner* — Adrian S. Wilson
*Assistant Examiner* — Abhishek Rathod
(74) *Attorney, Agent, or Firm* — Finnegan, Henderson, Farabow, Garrett & Dunner, L.L.P.

(57) ABSTRACT

An object of the present invention is to provide an elastic signal transmission cable having a length of several centimeters to several meters that has a shape deformation tracking ability and enables high-speed signal transmission. The inventive elastic signal transmission cable has an elasticity of 10% or more and transmission loss of 10 dB/m or less in a relaxed state at 250 MHz, and comprises an elastic cylindrical body having an elasticity of 10% or more and a conductor portion containing at least two conductor wires wound in the same direction around the elastic cylindrical body.

6 Claims, 4 Drawing Sheets

(56) References Cited

U.S. PATENT DOCUMENTS

| | | | | | |
|---|---|---|---|---|---|
| 3,476,870 | A * | 11/1969 | Ross | | 174/69 |
| 3,646,247 | A * | 2/1972 | Sennett et al. | | 174/117 M |
| 4,486,623 | A | 12/1984 | Ploppa | | |
| 4,523,619 | A * | 6/1985 | Gouttebessis | | 152/527 |
| 4,664,158 | A * | 5/1987 | Sands | | 139/422 |
| 4,683,349 | A | 7/1987 | Takebe | | |
| 4,782,196 | A * | 11/1988 | Ukai | | 174/131 A |
| 4,966,434 | A * | 10/1990 | Yonechi et al. | | 385/103 |
| 5,957,434 | A * | 9/1999 | Nilsson | | 256/10 |
| 6,735,481 | B1 * | 5/2004 | Bingham et al. | | 607/149 |
| 2006/0257086 | A1 * | 11/2006 | Ohsono et al. | | 385/123 |
| 2007/0054511 | A1 * | 3/2007 | Ittel | | 439/66 |
| 2007/0264124 | A1 | 11/2007 | Mueller et al. | | |
| 2008/0262584 | A1 * | 10/2008 | Bottomley et al. | | 607/119 |
| 2010/0006320 | A1 * | 1/2010 | Tatsumi | | 174/113 R |

FOREIGN PATENT DOCUMENTS

| | | |
|---|---|---|
| JP | 61-11211 | 1/1986 |
| JP | 61-163513 | 7/1986 |
| JP | 1-63010 | 4/1989 |
| JP | 2002-313145 | 10/2002 |
| JP | 2003-217359 | 7/2003 |
| JP | 2004-134313 | 4/2004 |
| JP | 2005-347247 | 12/2005 |

OTHER PUBLICATIONS

Korean Office Action for corresponding KR Application No. 10-2010-7019100 dated Sep. 30, 2011.

European Search Report for corresponding EP Application No. 08777601.9 dated Aug. 29, 2012.

* cited by examiner

ELASTIC SIGNAL TRANSMISSION CABLE

TECHNICAL FIELD

The present invention relates to an elastic signal transmission cable having elasticity and superior high-speed signal transmission properties.

BACKGROUND ART

Signal transmission cables mainly consist of coaxial cables, twisted pair cables and flexible flat cables. Known examples of cables having superior flexibility and bendability include a flexible flat cable that uses a polyolefin resin for a lowly conductive layer (see Patent Document 1), and a flexible flat cable in which a flexible printed circuit board is wound in the form of a spiral around a core material (see Patent Document 2). However, although both of these cables are resistant to bending, they do not demonstrate elasticity.

In the case of designing a high-speed signal transmission cable, the distance between two conductor wires and the dielectric surrounding the conductor wires are known to affect transmission properties. Consequently, it is a common practice to maintain a constant distance between the two conductor wires by immobilizing with resin and the like, while the idea of separately winding two independent conductor wires to transmit signals while demonstrating elasticity has yet to be conceived.

On the other hand, although coaxial cables are typically rigid and are known to be imparted with elasticity by forming into a so-called curl cord, none of these coaxial cables impart elasticity by winding around an elastic core material.

In addition, twisted pair cables consist of tightly twisting two conductor wires, and none of these cables have been imparted with elasticity.

In addition, an example of an elastic wire is disclosed in Patent Document 3 in the form of a method that uses a covering apparatus to wind two conductor wires by S/Z twisting (two directions) around a core material such as an elastic long fiber followed by bundling a plurality of the wound wires into a single wire. According to this patent document, this elastic wire is disclosed as being able to be used as earphone cords or USB single cables. However, there is no description whatsoever regarding transmission properties.

When a conductor wire is wound in one direction around an elastic core material, a large amount of winding torque remains resulting in the occurrence of twisting. Consequently, in the case of winding two conductor wires around an elastic core material, the wires are typically wound by S/Z twisting (in two directions).

Although Patent Document 6, which relates to a signal transmission filament, describes to the effect that a signal transmission thread is wound around a core material, this consists of winding a single metal wire as exemplified by flat copper wire, and does not consist of winding two or more conductor wires. In addition, there is no description relating to transmission properties, and according to findings of the inventors of the present invention, this cable is unable to realize high-speed signal transmission.

With respect to methods used to connect an elastic support and wire, although a technology for winding a wire around an elastic support is disclosed in Patent Document 7, this document discloses technology for a connecting component, does not disclose technology for use as a cable, and does not contain any description whatsoever regarding elasticity or transmission properties.

Although Patent Document 8, which relates to a rotor blade cable, describes to the effect that a conductor wire is wound around an elastic body, this has high tension but does not have elasticity.

Recently, accompanying remarkable progress made in the areas of robots and wearable electronic devices, there are a growing number of cases requiring instantaneous exchange of images (video images) obtained with a camera with an arithmetic processor (computer) (or in other words, high-speed signal transmission).

However, since signal transmission cables lack elasticity, the length of wires at the locations of bends (such as the joints of a robot) is required to be equal to or longer than the maximum length during operation. Consequently, problems occur such as sagging of the cable during operation, cables becoming pinched in or caught on bending portions causing disconnections therein, and cables becoming disconnected from connectors.

In addition, in the case of wearable electronic devices, since the wiring lacks elasticity, these devices require the use of a large jacket and the like, thereby resulting in problems such as being unable to produce wearable electronic devices that closely fit the contour of the body or causing discomfort when worn.

In order to solve these problems, there is a need for a cable several centimeters to several meters in length that has shape deformation tracking ability and enables high-speed signal transmission.

Patent Document 1: Japanese Unexamined Patent Publication No. 2008-47505

Patent Document 2: Japanese Unexamined Patent Publication No. 2007-149346

Patent Document 3: Japanese Unexamined Patent Publication No. 2002-313145

Patent Document 4: Japanese Unexamined Patent Publication No. 2004-134313

Patent Document 5: Japanese Unexamined Patent Publication No. S60-119013

Patent Document 6: Japanese Patent No. 3585465

Patent Document 7: Japanese Unexamined Patent Publication No. 2005-347247

Patent Document 8: U.S. Patent Application No. 2007/264124

DISCLOSURE OF THE INVENTION

Problems to be Solved by the Invention

An object of the present invention is to provide an elastic signal transmission cable having a length of several centimeters to several meters that has a shape deformation tracking ability and enables high-speed signal transmission.

Means to Solve the Problems

As a result of conducting extensive research on a cable that deforms to follow a wide range of movement and is also capable of high-speed signal transmission, the inventors of the present invention found that an elastic signal transmission cable, having an elasticity of 10% or more and transmission loss of 10 dB/m or less in a relaxed state at 250 MHz, and composed of an elastic cylindrical body having an elasticity of 10% or more and a conductor portion that contains at least two conductor wires wound in the same direction around the elastic cylindrical body, is able to achieve the aforementioned object, thereby leading to completion of the present invention.

Namely, the present invention provides the following inventions:

(1) an elastic signal transmission cable having an elasticity of 10% or more and transmission loss of 10 dB/m or less in a relaxed state at 250 MHz, and comprising an elastic cylindrical body having an elasticity of 10% or more and a conductor portion containing at least two conductor wires wound in the same direction around the elastic cylindrical body;

(2) the elastic signal transmission cable described in (1) above, wherein the conductor portion contains an insulating filamentous body wound on the outside of the conductor wires in the opposite direction of the conductor wires;

(3) the elastic signal transmission cable described in (1) above, wherein the conductor portion contains an insulating filamentous body alternately passing over the outside and inside (elastic cylindrical body side) of a single or plurality of conductor wires and wound in the opposite direction of the conductor wires;

(4) the elastic signal transmission cable described in any of (1) to (3) above, wherein the conductor wires are wound in parallel, a variation r in the interval between proximal conductor wires is such that $0 \leq r \leq 4d$ (where d is the average interval between proximal conductor wires when relaxed), an average interval d' when stretched by arbitrarily stretching to a stretch limit is within the range of ½d to 4d, and there is no deviation from this range even accompanying repeated stretching;

(5) the elastic signal transmission cable described in any of (1) to (4) above, wherein the wound diameter of the conductor wires is 0.05 to 30 mm, the conductor wires are wound in parallel, the winding pitch of the conductor wires is 0.05 to 50 mm, and the interval between proximal conductor wires is 0.01 to 20 mm;

(6) the elastic signal transmission cable described in any of (1) to (5) above, further having an outer coating layer composed of an insulating fiber around the outside of the conductor portion;

(7) the elastic signal transmission cable described in any of (1) to (6) above, further having an outer coating layer composed of a resin having rubber elasticity around the outside of the conductor portion;

(8) the elastic signal transmission cable described in any of (1) to (7) above, wherein the 20% stretch load is less than 5000 cN, and the 20% stretch recovery rate is 50% or more;

(9) a production method of the elastic signal transmission cable described in any of (2) and (4) to (8) above, comprising: winding a plurality of conductor wires or a plurality of conductor wires and at least one insulating filamentous body in the same direction around the elastic cylindrical body with the elastic cylindrical body in a stretched state, and further winding at least one insulating filamentous body around the outside of the conductor wires in the opposite direction of the conductor wires, using an apparatus that has a function for stretching the elastic cylindrical body, a function for winding a plurality of conductor wires or a plurality of conductor wires and at least one filamentous body in the same direction around the elastic cylindrical body, and a function for winding at least one filamentous body in the opposite direction of the above direction; and,

(10) a production method of the elastic signal transmission cable described in any of (3) and (4) to (8) above, comprising: winding a plurality of conductor wires or a plurality of conductor wires and at least one insulating filamentous body in the same direction around the elastic cylindrical body with the elastic cylindrical body in a stretched state, and further winding at least one insulating filamentous body by alternately passing over the inside and outside (elastic cylindrical body side) of a single or a plurality of conductor wires in the opposite direction of the conductor wires, using an apparatus that has a function for stretching the elastic cylindrical body, a function for winding a plurality of conductor wires or a plurality of conductor wires and at least one filamentous body in the same direction around the elastic cylindrical body, and a function for winding at least one filamentous body in the opposite direction of the above direction.

Effects of the Invention

The elastic signal transmission cable of the present invention is useful as a transmission cable for robots or wearable electronic devices since it is able to propagate high-speed signals without causing signal disturbance or attenuation, has elasticity and has shape deformation tracking capability.

EXPLANATION OF THE REFERENCE SYMBOLS

Figure 1:
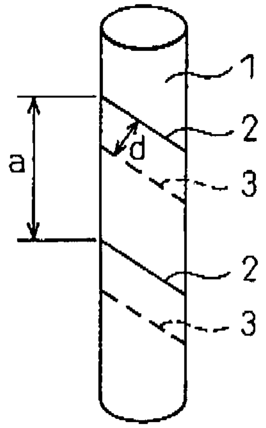
FIG. 1 is a schematic diagram of the elastic signal transmission cable of the present invention when relaxed.

1 Elastic cylindrical body
2 Conductor wire
3 Conductor wire
4 Insulating filamentous body
11 Conductor wire
12 Signal line
13 Signal line
14 Conductor wire
20 Sample
21 Chuck portion
22 Chuck portion
23 Stainless steel rod
30 SMA connector
31 Signal terminal
32 Ground terminal
40 SMA connector
41 Signal terminal
42 Ground terminal
a,a' Conductor wire pitch
d,d' Proximal conductor wire interval

BEST MODE FOR CARRYING OUT THE INVENTION

The following provides a detailed explanation of the present invention.

In the elastic signal transmission cable of the present invention, it is imperative that there be little change in the distance between two conductor wires serving as signal lines over their entire length even if the cable is stretched in order to propagate high-frequency signals without causing disturbance or attenuation thereof. In addition, in order to demonstrate elasticity, highly flexible conductor wires are required to be integrated with an elastic structure. The inventors of the present invention found that a signal transmission cable, which is obtained by winding at least two conductor wires in the same direction around an elastic cylindrical body having elasticity of 10% or more, satisfies these requirements.

It is necessary that the elastic signal transmission cable of the present invention demonstrate elasticity of 10% or more, preferably 20% or more and more preferably 30% or more. If the elasticity is less than 10%, deformation tracking capability becomes poor and the aforementioned object is unable to be achieved. Elasticity here refers to that for which a recovery rate obtained by stretching by a prescribed degree, such as 10%, followed by relaxing is 50% or more.

The elastic signal transmission cable of the present invention is used for the purpose of wiring that passes through portions equivalent to joints in order to be used as wiring of articulated robots and electronic devices worn on the body. Consequently, it has a target length of 1 m. In addition, it is required to have transmission loss of 10 dB/m or less at a high frequency of 250 MHz for high-speed signal transmission. Transmission loss in the present invention refers to an absolute value of a value (units: dB) obtained by measuring a parameter S21 (S21: transmission coefficient=transmission wave/incident wave) among S-parameters measured for a sample length of 1 m with a so-called network analyzer. In the case of transmission loss equal to or greater than this level of transmission loss, transmission properties become poor making the cable unsuitable for high-speed transmission. Transmission loss is preferably 7 dB/m or less, more preferably 6 dB/m or less, and particularly preferably 5 dB/m or less.

Figure 2:
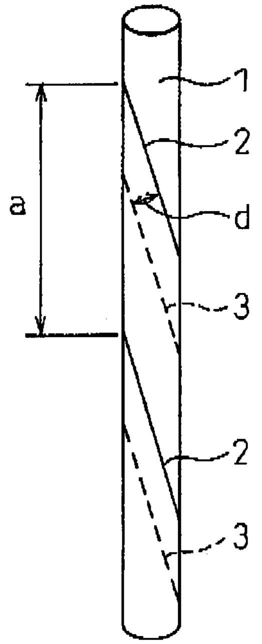
FIG. 2 is a schematic diagram of the elastic signal transmission cable of the present invention when stretched.

As shown in FIGS. 1 and 2, the elastic signal transmission cable of the present invention is composed of an elastic cylindrical body (1), which has elasticity of 10% or more, and a conductor portion containing at least two conductors wires (2 and 3) wound in the same direction around the elastic cylindrical body. Moreover, it also has an insulating outer coating layer around the outside of the conductor portion (the outer coating layer is not shown in the drawings). Furthermore, at least a portion of the conductor wires may be present within the surface layer of the elastic cylindrical body.

The elastic cylindrical body can be formed from an elastic long fiber, elastic tube or coil spring and the like.

In addition, the elastic cylindrical body preferably has a void there within. The void has the effect of enhancing elasticity since it increases the wound diameter of the conductor wires without inhibiting elasticity. Examples of methods for forming the void include a method in which an insulating fiber is arranged around an elastic long fiber, a method consisting of braiding an elastic long fiber or filamentous body in which an insulating fiber is arranged around an elastic long fiber, a method consisting of forming an elastic long fiber, a method in which an elastic long fiber is made to be hollow, and a combination thereof. In the case of forming the elastic cylindrical body from an elastic tube or coil spring, the elastic tube or coil spring is naturally hollow.

The elastic long fiber used to form the elastic cylindrical body is required to have elasticity of 10% or more, and preferably has elasticity of 50% or more. If the elasticity is less than 50%, elastic performance becomes poor and stress increases when the elastic signal transmission cable is stretched. An elastic long fiber having elasticity of 100% or more is used more preferably, while that having elasticity of 300% or more is used particularly preferably.

There are no particular limitations on the type of polymer of the elastic long fiber used in the present invention provided it has ample elasticity to the degree described above. Examples of elastic long fibers include polyurethane-based elastic long fiber, polyolefin-based elastic long fiber, polyester-based elastic long fiber, polyamide-based elastic long fiber, natural rubber-based elastic long fiber, synthetic rubber-based elastic long fiber, and composite rubber-based elastic long fiber composed of natural rubber and synthetic rubber.

Polyurethane-based elastic long fibers axe optimal for use as the elastic long fiber of the present invention since they have large elongation and superior durability.

Natural rubber-based long elastic fibers have less stress per cross-sectional area than other elastic long fibers, and offer the advantage of allowing an elastic signal transmission cable to be easily obtained that stretches with low stress. However, since these long elastic fibers are susceptible to deterioration, it is difficult to retain elasticity over a long period of time. Thus, these elastic long fibers are preferable for applications targeted at short-term use.

Although synthetic rubber-based elastic long fibers have superior durability, it is difficult to obtain products having large elongation. Thus, these elastic long fibers are preferable for applications that do not require excessively large elongation.

The elastic long fiber may be a monofilament or multifilament.

The diameter of the elastic long fiber is preferably within the range of 0.01 to 20 mm, more preferably 0.02 to 10 mm and even more preferably 0.03 to 5 mm. In the case the diameter is 0.01 mm or less, elasticity is not obtained, while if the diameter exceeds 20 mm, a large force is required for stretching.

Integration of the elastic cylindrical body and the conductor portion (for preventing the conductor portion from shifting out of position when stretched) can be facilitated by preliminarily using a two-ply or multi-twist fiber for the elastic long fiber or using the elastic long fiber as a core and winding a different elastic long fiber there around.

A coil spring used to form the elastic cylindrical body in the present invention may be a non-metal coil spring or metal coil spring. A non-metal coil spring has little effect on transmission properties. Metal coil springs do not deteriorate at high temperatures and are suited for applications involving use in high-temperature environments. The coil-shaped spring can be suitably designed according to selection of a coiling machine and setting the conditions of the selected coiling machine.

In the case of a coil spring alone, since conductor wires cannot be wound the periphery thereof, an elastic cylindrical body can be obtained by forming braiding and the like of insulating fibers around the coil spring in advance.

The relationship between coil diameter Cd and stretched wire diameter (referring to the wire material that forms the coil) Sd is preferably such that 24>Cd/Sd>4. In the case Cd/Sd is 24 or more, a spring of a stable shape is unable to be obtained and is easily deformed, thereby making it undesirable. The value of Cd/Sd is preferably 16 or less. On the other hand, if the value of Cd/Sd is 4 or less, in addition to it being difficult to form coils, it is also difficult for the spring to demonstrate elasticity. Thus, the value of Cd/Sd is preferably 6 or more.

The stretched wire diameter Sd is preferably 3 mm or less. If it is 3 mm or more, the spring becomes heavy and stretching stress and coil diameter also increase, thereby making this undesirable. On the other hand, if the stretched wire diameter is 0.01 mm or less, the spring able to be formed is excessively weak, easily deforms when subjected to lateral force, and is not practical.

The coil pitch interval is preferably ½ Cd or less. Although it is possible to form a coiled spring at a greater interval than this, it becomes difficult to form braiding of insulating fibers and the like around the periphery of the coils. Moreover, elasticity decreases and there is increased susceptibility to deformation by external force, thereby making this undesirable. The coil pitch interval is more preferably 1/10 Cd or less.

A coil spring in which the pitch interval is nearly zero has the characteristics of being able to demonstrate the greatest elasticity, being resistant to entangling of the spring itself, and facilitating extraction of a wound spring, while also offering the advantage of being resistant to deformation by external force, thereby making this desirable.

The coil diameter is preferably within the range of 0.02 to 30 mm, more preferably 0.05 to 20 mm and even more preferably 0.1 to 10 mm. It is difficult to produce a coil spring having an outer diameter of 0.02 mm or less, while wound diameter of the conductor wires becomes excessively large if the coil diameter exceeds 30 mm, thereby making this undesirable.

The material of the coil spring can be selected arbitrarily from known stretched wire materials. Examples of stretched wire materials include piano wire, hard steel wire, stainless steel wire, oil tempered wire, phosphor bronze wire, beryllium copper wire and nickel silver wire. Stainless steel wire is preferable from the viewpoint of superior corrosion resistance and heat resistance as well as availability.

The elastic tube has a void inside, and can either be used as is as an elastic cylindrical body or can be used as an elastic cylindrical body after forming a fiber layer on the outer layer of the elastic tube. Since the elastic tube is easily damaged if direct contact is made between the conductor wires and the elastic tube, a fiber layer is preferably formed on the outer layer of the elastic tube.

In addition, conductor wires can also be embedded within the elastic tube. For example, after winding conductor wires around a stainless steel core and immersing in or coating with rubber latex, conductor wires can be embedded in the elastic tube by extracting the stainless steel core inside after carrying out a known method (such as vulcanization treatment, heat treatment or drying treatment).

The elasticity of the elastic cylindrical body is required to be 10% or more, preferably 30% or more and more preferably 50% or more. In the case the elasticity is less than 30%, elongation may decrease due to coating of the conductor portion and outer coating layer resulting in a signal transmission cable having low elasticity.

The 20% stretch load of the elastic cylindrical body is preferably 5000 cN or less, more preferably 2000 cN or less and particularly preferably 1000 cN or less.

The diameter of the elastic cylindrical body is 30 mm or less, preferably 20 mm or less and more preferably 10 mm or less. If the diameter is 30 mm or more, the elastic cylindrical body becomes thick and heavy, which is not preferable in terms of practical use.

The conductor wires used in the present invention are preferably stranded wires of filaments composed of a substance having satisfactory electrical conductivity. Since stranded wires of fine metal wires are soft and resistant to breakage, they contribute to elasticity of the elastic signal transmission cable and improvement of durability.

Although filaments can be used alone as conductor wires that compose signal wires, transmission properties decrease if electrical resistance becomes excessively large. Consequently, they are preferably used by stranding two or more filaments into a single conductor wire. There is no particular upper limit on the number of strands, and can be set arbitrarily in consideration of flexibility and electrical resistance. Since increasing the number of strands causes a decrease in productivity, the number of strands is preferably 10,000 or less and more preferably 1,000 or less.

A substance having satisfactory electrical conductivity refers to an electrical conductor having a specific resistance of $1\times10^{-4}$ Ω·cm or less, and particularly preferably a metal having a specific resistance of $1\times10^{-5}$ Ω·cm or less. Specific examples thereof include copper (specific resistance: $0.2\times10^{-5}$ Ω·cm) and aluminum (specific resistance: $0.3\times10^{-5}$ Ω·cm).

Copper wire is the most preferable since it is comparatively inexpensive, has low electrical resistance, and can easily be formed into filaments. Aluminum wire is the next most preferable after copper wire due to its light weight. Although common types of copper wire include annealed copper wire and copper-tin alloy wire, strong copper alloy wire having enhanced strength (such as that in which iron, phosphorous or indium and the like has been added to oxygen-free copper), copper wire that is prevented from being oxidized by plating with tin, gold, silver or platinum, or that which has been surface-treated with gold or other element for the purpose of improving electrical signal transmission properties, can also be used, although not limited thereto.

The single wire diameter of filaments that compose the conductor wires is preferably 0.5 mm or less, more preferably 0.1 mm or less and particularly preferably 0.05 mm or less. Reducing the diameter of the filaments makes it possible to enhance flexibility. Moreover, reducing the diameter of the filaments makes it possible to increase surface area and enhance transmission properties with respect to skin effects characteristic of high frequencies. Since excessively reducing single wire diameter results in increased susceptibility to breakage during processing, the single wire diameter is preferably 0.01 mm or more.

Various methods are known for stranding filaments, and any known method may be used to strand filaments in the present invention as well. However, since simply drawing the filaments into straight wires makes winding difficult, the filaments are preferably in the form of twisted wires. In addition, stranded wires can also be used wound with an insulating fiber in order to demonstrate flexibility.

Each filament or conductor wire is preferably insulated in the conductor wires used in the present invention. The thickness and type of insulating layer is arbitrarily designed according to the application of the elastic signal transmission cable.

The insulating material is selected in consideration of insulating properties, transmission properties and flexibility. The insulating material can be arbitrarily selected from known insulating materials.

A so-called enamel coating agent can be used as an insulating material that insulates and covers each filament. Examples of enamel coating agents include polyurethane coating agents, polyurethane-nylon coating agents, polyester coating agents, polyester-nylon coating agents, polyesterimide coating agents and polyesterimide-amide coating agents.

The insulating material used to insulate and cover the conductor wires is preferably a material having a low dielectric constant from the viewpoint of transmission properties, examples of which include fluorine-based and polyolefin-based insulating materials. Vinyl chloride and rubber-based insulating materials are preferable examples from the viewpoint of flexibility.

An insulating material that contains air can also be used. Foamed products of the aforementioned insulating materials can be used to obtain an insulating material containing air. Air has a low dielectric constant and has the effect of lowering the dielectric constant.

An insulating layer containing air can also be formed by covering the conductor wires with an assembly of insulating fibers. Although there are no particular limitations on the insulating fibers, polyester fibers and nylon fibers are examples of insulating fibers that are inexpensive, have high strength and have superior handling ease. Fluorine fibers and polypropylene fibers having a low dielectric constant can also be used to enhance transmission properties. Silk, cotton or rayon staple fibers can also be used.

In order to decrease susceptibility to the effects of moisture, fibers can also be used that have undergone water repellency processing.

The conductor wires can also be covered with an insulating material containing air in the form of tape composed of insulating paper or insulating non-woven fabric. An insulating oily agent can also be impregnated to enhance insulating properties.

The elastic signal transmission cable of the present invention can be obtained by winding two or more conductor wires in the same direction around an elastic cylindrical body having elasticity of 10% or more.

The conductor wires are preferably wound in parallel. Winding in parallel refers to the state in which the conductor wires are wound in the same direction without any crossing or overlapping thereof, and preferably without any partial overlapping as well. Overlapping portions cause a decrease in transmission properties while also causing breakage during repeated stretching, thereby making them undesirable. In addition, winding the conductor wires in parallel facilitates the obtaining of an elastic signal transmission cable that has compact size and ample elasticity.

Conventionally known S/Z winding causes a decrease in transmission properties due to locations where the interval between the conductor wires nearly reaches zero and locations where the interval increases considerably. Moreover, intersecting portions are rubbed together due to stretching resulting in increased susceptibility to shorting and breakage, thereby making this undesirable in terms of practical use.

The elastic signal transmission cable of the present invention preferably retains air between each conductor wire. Air is a medium that has a low dielectric constant, and has the effect of enhancing transmission properties.

In order to retain air, a filamentous body composed of an insulating fiber can be interposed between the conductor wires, a hollow tube can be interposed between the conductor wires, or the entire conductor wires can be covered with a foamable resin.

The elastic signal transmission cable of the present invention can also be obtained by winding a micro coaxial cable around the elastic cylindrical body. A micro coaxial cable is composed of a central conductor and substantially two conductor wires of a surrounding conductor, and the two conductor wires can be considered to be wound in the same direction. Micro coaxial cables maintain the dielectric between the conductors in a constant state, thereby making it possible to reduce transmission loss.

The micro coaxial cable preferably has a thickness of within 3 mm. A micro coaxial cable having high bendability and flexibility is used particularly preferably. The permissible bending radius is preferably 10 mm or less and more preferably 5 mm or less. In the case the bending radius is 10 mm or more, the wound diameter becomes excessively large or elasticity decreases.

The elastic signal transmission cable of the present invention can also be obtained by winding a so-called twisted pair cable around the elastic cylindrical body. A twisted pair cable can also be wound with another twisted pair cable or wound with another conductor wire and another twisted pair cable. In the case of winding a plurality of twisted pair cables, those having different twist pitches are wound preferably. The use of twisted pair cables having the same pitch results in increased susceptibility to the occurrence of so-called crosstalk. In either case, the cables are required to be wound in the same direction. Cables wound in two directions result in overlapping portions among the conductor wires resulting in a decrease in transmission properties, and are not suitable for high-speed transmission. In addition, winding in two directions also results in increased susceptibility to breakage due to repeated stretching, thereby preventing the object of the present invention from being achieved.

The elastic signal transmission cable of the present invention can also be obtained by winding a so-called flexible flat cable around the elastic cylindrical body. The width of the flexible flat cable is preferably 10 mm or less and more preferably 5 mm or less. The thickness is preferably 3 mm or less and more preferably 2 mm or less. The use of a flexible flat cable of a larger size than this makes it difficult to demonstrate flexibility even wound around the elastic cylindrical body. Two or more conductor wires are required to be contained in the flexible flat cable. There are limits on the width of cables able to be used as well as on the number of conductor wires contained due to the restriction of demonstrating elasticity. In consideration of the balance with transmission properties, the number of conductor wires contained is preferably within 20 and more preferably within 10.

The number of conductor wires used is required to be two or more. If only one conductor wire is used, the resulting cable cannot be used as a transmission cable. Examples of typically employed cases include the use of 2, 3, 4, 5 or 6 to 10 conductor wires. Although there no particular limitations on the upper limit thereof, if the number of conductor wires is 30 or more, elasticity is easily impaired. The number of conductor wires is preferably within 20 and particularly preferably 3 to 10.

In the case of using only two conductor wires, one of the wires is used as a signal line while the other is used as a ground line. In the case of using three conductor wires, two can be used as signal lines while one is used as a ground line or one can be used as a signal line, one as a power line and one as a ground line.

A cable that has both a signal line and power line is used preferably as a highly universal cable. Although differential transmission systems tend to be used in high-frequency fields in particular, the use of a total of four conductor lines consisting of two signal lines, a power line and a ground line allows the obtaining of an elastic signal transmission cable capable of both signal transmission by differential transmission and the supplying of electrical power.

Since larger current flows through power lines than signal lines, the thickness of the power lines is preferably equal to or greater than that of the signal lines.

Since the effects of electrical resistance are smaller in high-frequency fields, a conductor wire having a comparatively high resistance value can be used as a signal line. On the other hand, a conductor wire having low electrical resistance is preferably used as a power line. The electrical resistance of a signal line per 1 meter of elastic signal transmission cable when relaxed is preferably 100 Ω/m or less and more preferably 10 Ω/m or less. On the other hand, the electrical resistance of a power line is preferably 20 Ω/m or less and more preferably 5 Ω/m or less.

The ground line preferably has electrical resistance equal to that of the signal line, and electrical resistance is more preferably equal to that of the power line.

The conductor wires are preferably restrained by an insulating filamentous body at one or more locations per winding. In the case the conductor wires are not restrained, the interval between conductor wires fluctuates due to stretching resulting in a decrease in transmission properties, thereby making this undesirable in terms of practical use. The conductor portion is composed of conductor wires and an insulating filamentous body.

A known insulating filamentous body can be arbitrarily used for the insulating filamentous body. For example, multifilament, monofilament or spun yarn can be used. Multifilament is used preferably. Preferable examples from the viewpoints of narrow diameter, flexibility, high restraining force (high strength) and cost include polyester fiber and nylon fiber. Preferable examples from the viewpoint of low dielectric constant include fluorine fibers, polyethylene fibers and polypropylene fibers. Preferable examples from the viewpoint of flame resistance include vinyl chloride fiber, saran fiber and glass fiber. Preferable examples from the viewpoint of elasticity include polyurethane fiber and fibers in which the outside of polyurethane fiber is covered with another insulating fiber. Other examples of fibers that can be used include silk, rayon fiber, cupra fiber and spun cotton yarn. However, the fiber that can be used is not limited thereto, but rather various known insulating fibers can be used arbitrarily.

Winding the conductor wires in a single direction (for example, Z direction) and winding an insulating filamentous body thereon in the opposite direction (S direction) makes it possible to restrain the conductor wires and prevent them from shifting out of position due to stretching.

Figure 3:
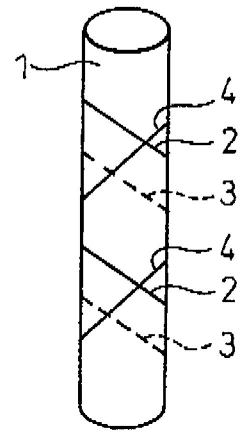
FIG. 3 is a drawing showing an example of a method for winding an insulating filamentous body of the elastic signal transmission cable of the present invention.

As shown in FIG. 3, in the case of winding an insulating filamentous body on the outside of conductor wires using a covering machine, increasing the winding speed (increasing the spindle rotating speed) causes an increase in winding tension (ballooning tension) and makes it possible to increase restraining force.

Figure 4:
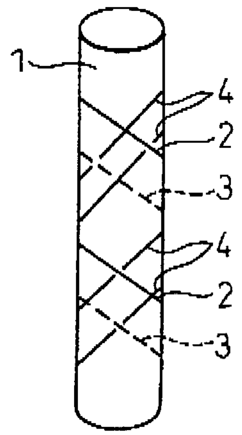
FIG. 4 is a drawing showing an example of another method for winding an insulating filamentous body of the elastic signal transmission cable of the present invention.

More preferably, the conductor wires are restrained by winding an insulating filamentous body in the opposite direction of the conductor wires while alternately passing through the inside (elastic cylindrical body side) and outside of the conductor wires as shown in FIG. 4. Winding the insulating filamentous body in the opposite direction of the conductor wires while alternately passing through the inside and outside of the conductor wires makes it possible to obtain an elastic signal transmission cable that demonstrates little change in the interval between conductor wires during stretching and relaxing even during repeated stretching and bending movement accompanying repeated stretching, as well as little change in the interval between conductor wires caused by repeated stretching. In the case of alternately passing through the inside and outside of the conductor wires, the insulating filamentous body may alternately pass through one conductor wire at a time or may alternately pass through a plurality of conductor wires collectively.

The insulating filamentous body is preferably narrower than the conductor wires. The use of a thick insulating filamentous body forces the conductor wires per se to be deformed, thereby making stretching difficult.

In order to enhance restraining force, the insulating filamentous body is preferably alternately wound through the inside and outside of the conductor wires so as to have at least one or more, preferably four or more, and more preferably eight or more restraining points per winding.

Winding tension can be enhanced and restraining force can be increased by applying a load to the wound filamentous body.

In addition, an insulating filamentous body can be interposed between the conducting wires to prevent the conducting wires from mutually shifting out of position, and the insulating filamentous body can be alternately wound by passing through the inside and outside thereof either together with or separate from the filamentous body interposed between the conductor wires. The presence of this interposed filamentous body makes it possible to control the distance between conductor wires and adjust characteristic impedance.

The conductor wires and the elastic cylindrical body may be adhered in the elastic signal transmission cable of the present invention. Normally, adhesives lack elasticity and when coated so as to cover the entire elastic cylindrical body, cause the elastic cylindrical body to lose elasticity. In order to prevent this, a method is used in which the conductor wires and elastic cylindrical body are adhered using an elastic polyurethane and the like, or a method is used in which the conductor wires and elastic cylindrical body are only adhered at the contact surface thereof.

The conductor wires are preferably wound in the same direction and at a constant pitch. If the pitch varies in the direction of length, the characteristic impedance of the conductor wires fluctuates resulting in a decrease in transmission properties.

The winding pitch of the conductor wires as represented by "a" in FIG. 1 is preferably 0.05 to 50 mm. If this pitch is 0.05 mm or less, the length of the wound conductor wires becomes excessively long and transmission properties decrease. In the case the pitch is 50 mm or more, there is a lack of elasticity. The winding pitch is more preferably 0.1 to 20 mm and particularly preferably 1 to 10 mm.

The interval between proximal conductor wires independently wound in parallel ("d" indicates the interval between proximal conductor wires in FIG. 1) is such that the average interval when relaxed, as determined by observing 30 windings while in the relaxed state, and variation r (r=maximum interval−minimum interval) is preferably $0 \leq r < 4d$. Transmission properties decrease in the case there is variation of 4d or more. The variation r is more preferably 3d or less and particularly preferably 2d or less. Furthermore, in the present invention, the interval between proximal conductor wires represents the shortest distance between the centers of adjacent conductor wires.

In the elastic signal transmission cable of the present invention, the average interval d' of proximal conductor wires when arbitrarily stretched to a stretch limit is preferably such that $\frac{1}{2}d < d' < 4d$, and is more preferably 3d or less and particularly preferably 2d or less. The average interval d' preferably does not deviate from this range even as a result of repeated stretching. Deviation from this range causes a decrease in transmission properties.

Furthermore, the stretch limit as referred to in the present invention refers to a value obtained by multiplying 0.7 by a limit stretch rate at which stretch rate no longer recovers to 20% or less even if relaxed after stretching.

The interval between two proximal conductor wires is preferably 0.01 to 20 mm. If the interval is less than 0.01 mm, there is the risk of a short due to stretching. In the case the interval is 20 mm or more, the characteristic impedance value increases due to stretching resulting in a decrease in transmission properties. The interval is more preferably 0.02 to 10 mm and particularly preferably 0.05 to 5 mm.

The wound diameter of the conductor wires is preferably 0.05 to 30 mm, more preferably 0.1 to 20 mm and particularly preferably 0.5 to 10 mm. If the wound diameter is 30 mm or more, the resulting outer diameter becomes excessively large, thereby making this undesirable. Moreover, impedance values also change as a result of stretching thereby causing a decrease in transmission properties. In the case the wound diameter is 0.05 mm or less, it becomes difficult to wind the conductor wires.

If the pitch, interval and wound diameter of the conductor wires are within the aforementioned ranges, an elastic signal transmission cable having compact size and satisfactory elasticity is easily obtained, while also facilitating the obtaining of a cable having characteristic impedance of 500Ω or less and satisfactory transmission properties.

The elastic signal transmission cable of the present invention may also have an outer coating layer. As a result of having an outer coating layer, the cable is protected from physical and chemical stimuli resulting in improved durability. The outer coating layer is preferably formed from an insulating fiber or elastic resin having rubber elasticity.

Coatings made from insulating fibers are unlikely to impair elasticity and are suitable for applications requiring soft elasticity. In addition, insulating fibers make it possible to coat the cable while minimizing decreases in transmission properties since the insulating fibers contain large amounts of air having a low dielectric constant.

Insulating fibers having a low dielectric constant are preferable since they do not cause significant decreases in transmission properties. Examples of insulating fibers having a low dielectric constant include fluorine fibers, polyethylene fibers and polypropylene fibers.

Water-repellent insulating fibers are preferable since they have the effect of preventing entrance of water, which has a high dielectric constant. More specifically, water-repellent insulating fibers such as fluorine fibers or polypropylene fibers can be used, or polyester fibers or nylon fibers that have been subjected to water repellency treatment can also be used. The water repellent used can be arbitrarily selected from known repellents. Specific examples of water repellents include fluorine-based and silicon-based water repellents.

A multifilament, monofilament or spun yarn can be used for the insulating fiber. A multifilament is preferable since it has satisfactory coatability and is resistant to the occurrence of fraying.

The insulating fiber can be arbitrary selected from known insulating fibers according to the application of the elastic signal transmission cable and the presumed conditions of use. Although the insulating fiber may be an unprocessed yarn, a pre-colored yarn or pre-dyed yarn can also be used from the viewpoints of design and prevention of deterioration. Flexibility and frictional properties can be improved by finishing processing. Moreover, handling ease during actual use can also be improved by carrying out known fiber processing on the insulating fiber, such as flame retardation processing, oil repellency processing, soiling resistance processing, antimicrobial processing, microbial control processing or deodorizing processing.

Examples of insulating fibers that realize both heat resistance and wear resistance include aramid fibers, polysulfone fibers and fluorine fibers. Examples of refractory insulating fibers include glass fibers, refractory acrylic fibers, fluorine fibers and saran fibers. High-strength polyethylene fibers and polyketone fibers are added from the viewpoints of wear resistance and strength. Examples of insulating fibers used from the viewpoints of cost and heat resistance include polyester fibers, nylon fibers and acrylic fibers. Flame-resistant polyester fibers, flame-resistant nylon fibers and flame-resistant acrylic fibers (modacrylic fibers), to which flame retardation has been added, are also preferable. Non-melting fibers are used preferably with respect to local deterioration caused by frictional heat. Examples of such fibers include aramid fibers, polysulfone fibers, cotton, rayon, cupra, wool, silk and acrylic fibers. In cases in which emphasis is placed on strength, examples in fibers used include high-strength polyethylene fibers, aramid fibers and polyphenylene sulfide fibers. In cases in which emphasis is placed on wear resistance, examples of fibers used include fluorine fibers, nylon fibers and polyester fibers.

In cases in which emphasis is placed on design, acrylic fibers that demonstrate satisfactory coloring can be used.

Moreover, in cases in which emphasis is placed on feel during contact with the body, cellulose-based fibers such as cupra, acetate, cotton or rayon fibers, or silk or synthetic fibers having a high degree of fineness can be used.

Coating with an elastic resin or coating with a rubber tube is preferably used in applications for which there is the risk of infiltration by a liquid.

The elastic resin can be arbitrarily selected from various types of insulating elastic resins, and can be selected in consideration of the application of the elastic signal transmission cable and compatibility with other insulating fibers used simultaneously therewith.

Examples of performance properties that are taken into consideration include transmission properties, elasticity, wear resistance, heat resistance and chemical resistance.

An elastic resin having a low dielectric constant is preferable as an elastic resin having superior transmission properties. Typical examples of such resins include fluorine-based and olefin-based elastic resins.

Examples of resins having superior elasticity include so-called natural rubber-based elastic resins and styrene-butadiene-based elastic resins.

Examples of resins having superior wear resistance, heat resistance and chemical resistance include synthetic rubber-based elastic resins, with fluorine-based rubber, silicon-based rubber, ethylene-propylene-based rubber, chloroprene-based rubber and butyl-based rubber being preferable.

The outer coating layer composed of an insulating body can be a combination of braided insulating fibers and elastic resin. Although there are many cases in which it is desirable for elastic signal transmission cables to stretch with little force, in the case of coating with an elastic resin alone, the thickness of the elastic resin tends to increase thereby resulting in increased susceptibility to requiring a large force during stretching. In such cases, combining a thin elastic resin and braided insulating fibers makes it possible to realize both coatability and elasticity.

The elastic signal transmission cable of the present invention may also be shielded. Shielding can be provided by braiding an electrically conductive organic fiber or metal filament having satisfactory electrical conductivity, or by winding a tape having satisfactory electrical conductivity (such as aluminum foil).

After winding the conductor wires in parallel around the elastic cylindrical body, an insulating layer is formed with the insulating fiber and a shielding layer is formed around the outer periphery thereof. The shielding layer can be obtained by braiding an electrically conductive organic fiber, metal filament having satisfactory electrical conductivity, or a combination thereof. An outer coating layer composed of an insulating body is preferably formed on the outer layer of the shielding layer for the purpose of protecting the shielding layer.

An electrically conductive organic fiber refers to that having specific resistance of 1 Ω·cm or less. Examples of such organic fiber include plated fibers or fibers filled with an electrically conductive filler. A more specific example is silver-plated fibers.

The elastic signal transmission cable of the present invention preferably has transmission loss of 10 dB or less at 250 MHz when arbitrarily stretched to a stretch limit. Moreover, the difference between the maximum value and minimum value of transmission loss at 250 MHz when stretched and relaxed is preferably 2 dB or less. If the difference exceeds this range, signal transmission is disturbed by stretching thereby resulting in problems such as the inability of the cable to transmit signals. Particularly preferably, the transmission loss at 500 MHz when arbitrarily stretched to a stretch limit is 10 dB or less. Square waves used in high-speed signal transmission are synthesized by combining high-frequency waves. A cable having low transmission loss in the high-frequency range is able to transmit signals including high-frequency waves and is superior for high-speed signal transmission.

The elastic signal transmission cable of the present invention preferably has characteristic impedance of the conductor wires used as signal lines of 20 to 500Ω, and more preferably 50 to 300Ω.

Characteristic impedance is important from the viewpoint of matching the impedance of various electronic equipment connected by the cable, and if characteristic impedance deviates from the aforementioned range, practical transmission properties in the case of connecting with such electronic equipment decrease. Characteristic impedance is preferably adjusted corresponding to the electronic components used.

Characteristic impedance governs inductance and capacitance at high frequencies. These are greatly dependent on the wound diameter, winding pitch and conductor wire interval. As a result of winding the conductor wires in the same direction, changes in inductance and changes in capacitance attributable to stretching are offset, thereby making it possible to maintain transmission properties.

The elastic signal transmission cable of the present invention preferably has differential characteristic impedance of two conductor wires as determined by the TDR method within the range of 20 to 500Ω, more preferably 50 to 300Ω, and particularly preferably 100 to 200Ω. If outside of these ranges, reflection occurs during signal input and output, thereby causing a decrease in transmission properties.

Since differential signals are transmitted in pairs, the pair of conductor wires is preferably balanced. Balance here refers to a state in which the pair of conductor wires has the same structure and carries a voltage that is electromagnetically balanced. Consequently, in the case of winding the pair of conductor wires with other conductor wires, one of the other conductor wires is arranged between the pair of conductor wires, and the remaining conductor wires are preferably arranged in equal numbers on both sides of the pair of conductor wires in the case of an odd number of the other conductor wires. The other conductor wires are preferably arranged in equal numbers on both sides of the pair of conductor wires in the case of an even number of the other conductor wires. If other conductor wires are present between the pair of conductor wires, electromagnetic coupling of differential signals is interrupted, possibly resulting in a decrease in transmission properties.

Another conductor wire (preferably a ground line) is preferably arranged on the outside of the pair of conductor wires through which differential signals flow. The other conductor wire has the effect of shielding against radio waves emitted from the signal line and extraneous radio waves from the outside.

On the other hand, in the case of a using a plurality of signal lines in single-mode transmission, another conductor wire (preferably a ground line) is preferably arranged between the signal lines. A proximal ground line demonstrates a so-called shielding effect, which together with reducing crosstalk, has the effect of blocking radiant radio waves and incident radio waves.

Transmission properties decrease if the positional relationship between signal lines and other conductor wires changes due to stretching. Consequently, it is necessary for all conductor wires to be wound in the same direction.

The elastic signal transmission cable of the present invention preferably has a high stretch recovery rate. The recovery rate after stretching by 20% (20% stretch recovery rate) is preferably 50% or more. A cable that does not recover by 50% or more after stretching by 20% lacks shape deformation tracking capability. The cable more preferably recovers by 70% or more after stretching by 20%. The cable particularly preferably recovers by 70% or more after stretching by 30%. Most preferably, the cable recovers by 70% or more after stretching by 40%.

The elastic signal transmission cable of the present invention preferably stretches easily. The 20% stretch load is preferably less than 5000 cN, more preferably 2000 cN or less and even more preferably 1000 cN or less. A cable having a stretch load of 5000 cN or more requires a large load to be stretched, thereby making it undesirable.

The elastic signal transmission cable of the present invention preferably does not break or demonstrate a decrease in transmission properties even after being repeatedly subjected to prescribed stretching during use of 10,000 times or more, preferably 100,000 times or more and even more preferably 500,000 times or more. The present invention provides an elastic signal transmission cable having superior resistant to repeated stretching that is suitable for practical use.

The elastic signal transmission cable of the present invention can be obtained by winding in parallel two or more conductor wires around an elastic cylindrical body in a stretched state and wrapping an insulating filamentous body around the outside of the conductor wires in the opposite direction of the conductor wires using an apparatus having a function for stretching the elastic cylindrical, body, a function for winding a plurality of conductor wires in parallel around the elastic cylindrical body, and a function for winding a filamentous body in the opposite direction of the winding direction of the conductor wires.

More preferably, the function for winding an insulating filamentous body in the opposite direction of the winding direction of the conductor wires is a function that enables the insulating filamentous body to be wound by alternately passing through the inside (elastic cylindrical body side) and outside of the conductor wires, and a structure is employed in which the conductor wires are restrained by winding the insulating filamentous body by alternately passing through the inside and outside of one or a plurality of conductor wires in the opposite direction of the conductor wires.

There are no particular limitations on the apparatus provided it has the functions described above.

The main functions provided by an apparatus having the aforementioned functions are as indicated below.

(1) mechanism for supplying the elastic cylindrical body;

(2) mechanism for grasping the elastic cylindrical body and feeding at a constant speed (and preferably, a mechanism for grasping the elastic cylindrical body without nipping and supplying at a constant speed, such as a mechanism for feeding by grasping by aligning in a FIG. 8 with the V-grooves of a series of two rollers having a plurality of V-grooves);

(3) mechanism for grasping the elastic cylindrical body and winding up at a constant speed (and preferably, a mechanism for grasping the elastic cylindrical body without nipping and winding up at a constant speed, such as mechanism for winding up the elastic cylindrical body by grasping by aligning in a FIG. 8 with the V-grooves of a series of two rollers having a plurality of grooves, or a mechanism for winding up the elastic cylindrical body by winding a plurality of times on a V-groove of a large-diameter drum having a V-groove);

(4) a mechanism for winding the conductor wires or the conductor wires and the insulating filamentous body in parallel onto the elastic cylindrical body with the elastic cylindrical body stretched (for example, a mechanism for rotating a bobbin wound with the conductor wires or insulating filamentous body around the grasped elastic cylindrical body, a mechanism for rotating the grasped elastic cylindrical body and winding the conductor wires or insulating filamentous body around the elastic cylindrical body, or a mechanism for arranging a plurality of hollow bobbins wound with the conductor wires or insulating filamentous body in series, and winding the conductor wires onto the elastic cylindrical body by rotating the hollow bobbins while passing the elastic cylindrical body through the hollow portions of the hollow bobbins); and, (5) a mechanism for winding the insulating filamentous body in parallel onto the elastic cylindrical body in the opposite direction of the winding direction of the conductor wires with the elastic cylindrical body stretched, and particularly preferably a mechanism for winding the insulating filamentous body by alternately passing through the inside and outside of the conductor wires in a direction opposite of the winding direction of the conductor wires (for example, a mechanism for moving one or more bobbins wound with conductor wires and one or more bobbins wound with the insulating filamentous body forward and backward or up and down, and rotating the bobbins around the elastic cylindrical body in mutually opposite directions).

EXAMPLES

Although the following provides a detailed explanation of the present invention based on examples and comparative examples, the present invention is not limited to only these examples.

The evaluation methods used in the present invention are as indicated below.

(1) Elasticity

Marks were made on elastic signal transmission cables at 20 cm intervals. While holding the outside of the cables by hand, the cables were stretched so that the locations of the marks were 22 cm apart, after which the cables were relaxed and measured for length. The cables were categorized according to the following criteria. Cables able to be stretched to 22 cm and subsequently returned to less than 21 cm after relaxing (A) were evaluated as having elasticity of 10% or more.

A: Able to be stretched to 22 cm and returned to less than 21 cm after relaxing

B: Unable to be stretched to 22 cm, or able to be stretched to 22 cm but did not return to less than 21 cm even if relaxed (2) Directional Uniformity Cables were categorized according to the following criteria according to the direction in which the conductor wires are wound.

A: Conductor wires wound in a single direction

B: Conductor wires wound in two directions (3) Parallelism

Cables were visually observed over a length of 100 cm while wound with conductor wires, and evaluated according to the following criteria according to the presence or absence of overlapping portions of the conductor wires.

A: No overlapping portions

B: Some overlapping portions, but no crossed portions

C: Crossed and overlapping portions (4) Wound Diameter

Wound diameter was measured at three locations using a caliper in the relaxed state after winding the conductor wires, and the average value of those measured values was determined and defined as L1. In addition, the outer diameter of the conductor wires was measured at three locations using a caliper, and the average value of those measured values was determined and defined as L2. Wound diameter was then determined from the following equation:

$$\text{Wound diameter} = L1 - L2$$

(5) Pitch Interval

The distance of 30 arbitrary pitch values were measured using the same conductor wire, and the average value thereof was defined as pitch interval.

(6) Proximal Conductor Wire Interval

The distance between the centers of proximal conductor wires was measured at 30 arbitrary locations, and the average value thereof was defined as proximal conductor wire interval (d). The difference between the maximum value and minimum value was defined as variation (r).

(7) 20% Stretch Load

After allowing the sample to stand undisturbed for 2 hours or more under standard conditions (temperature: 20° C., relative humidity: 65%), a sample measuring 100 cm in length was pulled at a pulling speed of 100 mm/min using a Tensilon universal testing machine (A & D Co., Ltd.) under standard conditions to determine the load when stretched by 20%.

(8) Stretch Recovery

A sample measuring 100 mm in length was pulled at a pulling rate of 100 mm/min using a Tensilon measuring instrument, and after stretching at a prescribed stretch rate and allowing to return, the distance at which the stress became zero (A mitt: distance from location where stress reaches zero to the current location) was determined after which recovery rate was determined from the following equation. Recovery was evaluated according to the criteria indicated below.

$$\text{Recovery rate (\%)} = ((100 - A)/100) \times 100$$

A: Recovery rate≥70%

B: 70%>recovery rate≥50%

C: 50%>recovery rate (9) Repeated Stretching Test

Figure 5:
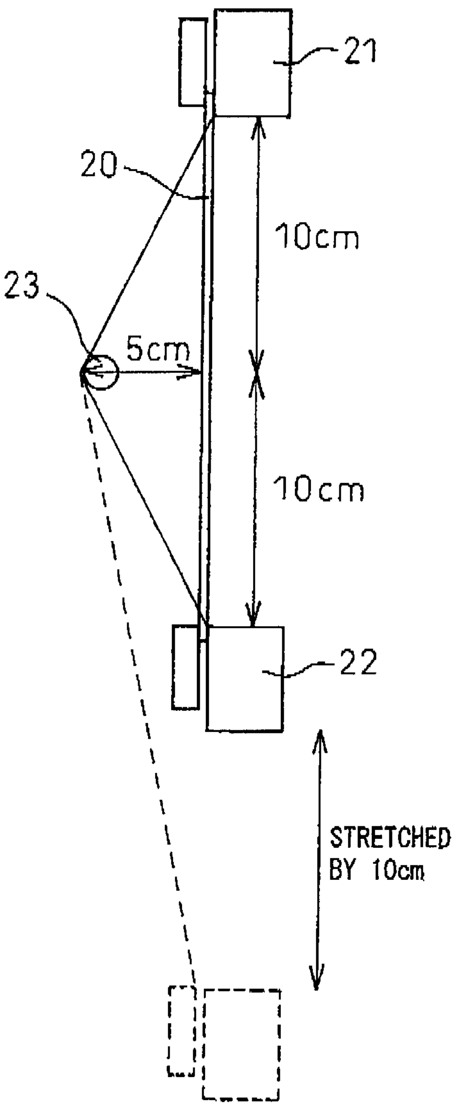
FIG. 5 is a schematic diagram of a repetitive elasticity measurement apparatus.

A chuck portion (21) and a chuck portion (22) were attached to a 20 cm length of a sample (20) as shown in FIG. 5, and a stainless steel rod (23) having a diameter of 1.27 cm was arranged at an intermediate location there between using a Dematcher Tester (manufactured by Daiei Kagaku Seiki Mfg. Co., Ltd.). The movable location of the chuck portion (22) was set to 30 cm corresponding to the location of the sample when stretched, and a repeated stretching test was carried out by repeatedly stretching the cable at room temperature for a prescribed number of times at the rate of 100 times/min at an initial stretch rate of 11% and stretched stretch rate of 59%.

The electrical resistance of all conductor wires of the samples was measured before and after the repeated stretching test, and the rate of change (ΔR) of electrical resistance before and after the repeated stretching test was determined from the following equation for the conductor wire demonstrating the greatest change.

$$\Delta R=100\times(R2-R1)/R1$$

(where, R1 is the electrical resistance before testing, and R2 is the electrical resistance after testing).

Breakage resistance was evaluated according to the following criteria based on the rate of change (ΔR) of electrical resistance.

AA: ΔR after repeating 500,000 times<1%

A: ΔR after repeating 100,000 times<1%

B: 1%≤ΔR after repeating 100,000 times<20%

C: 20%≤ΔR after repeating 100,000 times<∞

D: Breakage when repeated 100,000 times (ΔR becomes infinitely large after repeating 100,000 times)

(10) Transmission Loss

Measurement apparatus: Lightwave Component Analyzer (Hewlett-Packard 8703A)

Measurement method: 1 m of cable was sampled while in a relaxed state, the ends of a signal line and a conductor wire adjacent to a signal line on both ends were pulled out about 5 mm, and after enhancing electrical continuity between the filaments by immersing about 3 mm of the ends in a solder bath, the signal terminal and the ground terminal of subminiature type A (SMA) connector were soldered to each end followed by connecting to the aforementioned measurement apparatus, carrying out S parameter measurement, measuring S21 at 130 to 1000 MHz (S21: transmission coefficient=transmission wave/incident wave; units: dB), reading a prescribed frequency value from the resulting chart, and defining the absolute value thereof as transmission loss.

(11) Characteristic Impedance (Using Time Domain Reflectometry (TDR) method)

Measurement apparatuses: Digital Oscilloscope (Hewlett-Packard 54750A), Differential TDR Module (Agilent 54754A)

Measurement method: 1 m of 50Ω coaxial cable was connected to the aforementioned measurement apparatus, one end of a cable connected with SMA connectors on both ends obtained during measurement of transmission loss described in (10) above was connected to the end of the coaxial cable while the other end was left open, characteristic impedance (units: Ω) was measured for a maximum of 20 ns (nanoseconds) according to the TDR method, and values of the connector portion and endmost portion were excluded from the chart followed by reading off the minimum value and maximum value.

(12) Differential Characteristic Impedance (TDR Method)

Measurement apparatus: Digital Oscilloscope (Hewlett-Packard 54750A), Differential TDR Module (Agilent 54754A)

Figure 6:
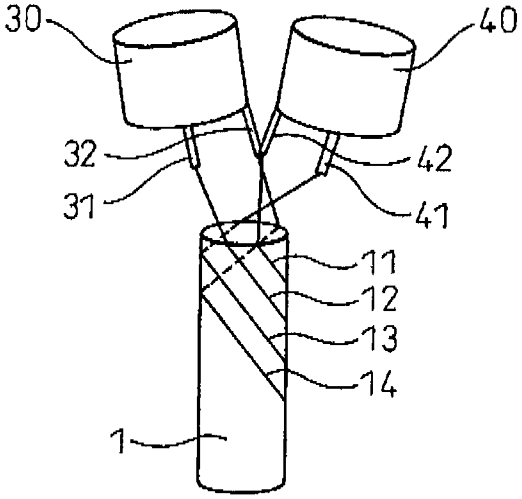
FIG. 6 is a drawing explaining a method for measuring differential characteristic impedance.

Measurement method; 1 m of cable was sampled while in a relaxed state, the ends of all conductor wires on an end thereof were pulled out about 5 mm, and after enhancing electrical continuity between the filaments by immersing about 3 mm of the ends in a solder bath, two signals lines transmitting a differential signal were soldered to the signal terminals of two SMA connectors, while the other conductor wires were bundled and soldered to preliminarily joined ground terminals (see FIG. 6). 50Ω coaxial cables (1 m) were connected to each connector, the coaxial cables were connected to two ports of the aforementioned measurement apparatus while the other ends were left open, and differential characteristic impedance was measured for a maximum of 20 ns (nanoseconds) according to the TDR method. The values of the connector portion and endmost portion were excluded from the chart followed by reading off the minimum value and maximum value.

(13) USB Device Operation Test

Measurement method: 1 m of cable was sampled in the relaxed state, and after pulling out the ends of the conductor wires on both ends by about 5 mm and enhancing electrical continuity between the filaments by immersing about 3 mm of the ends in a solder bath, the signal lines (two adjacent conductor wires unless specifically indicated otherwise) were soldered to terminal positions 2 and 3 of USB connector (A type, male threads), the other two conductor wires were soldered to terminal positions 1 and 4, the connections were covered with insulating vinyl tape, and USB connectors (A type, male threads) were connected to both ends to obtain a cable. One end of the cable was inserted into a USB port of a personal computer for which operation had been confirmed (Dynabook Satellite 12 PST101MD4H41LX) directly connected to a 300,000 pixel web camera (WCU204SV, Arvel) and preliminarily installed with the camera software, a USB conversion adapter (A type, male thread→A type, female thread (ADV-104, Ainex)) was inserted into the other end, and a USB connector of a 300,000 pixel web camera (WCU204SV, Arvel) was inserted into the adapter followed by investigating operation and evaluating according to the following criteria.

A: Operation with smooth image movement

B: Operation but unstable image movement

C: Does not operate

(14) Electrical Resistance 1 m of a sample was sampled while in the relaxed state, the ends of the conductor wires on both ends were pulled out about 5 mm, and after enhancing electrical continuity between the filaments by immersing about 3 mm of the ends in a solder bath, electrical resistance was measured with a Milliohm HiTester 3540 (Hioki E.E. Corp.).

(15) Water Resistance

Water resistance was evaluated according to the following criteria in the USB device operation test described in (13) above.

A: USB device operates when middle 50 cm of cable is immersed in water for 30 minutes or more B: USB device operates normally when 20 ml of water is poured onto middle of cable, but fails to operate when immersed in water for 30 minutes or more C: USB device operates normally when one drop of water is dropped onto cable with a dropper, but fails to operate when 20 ml of water are poured thereon D: USB device fails to operate when one drop of water is dropped onto cable with a dropper

Examples 1 and 2

Using a 940 dtex polyurethane elastic long fiber (Asahi Kasei Fibers Corp., trade name: Roica) as a core, 230 dtex wooly nylon (black-dyed yarn) was wound at a stretch ratio of 4.2 around the core by lower twisting at 700 T/M and upper twisting at 500 T/M to obtain a double cover yarn. The resulting double cover yarn was wound onto braiding bobbins, four of the bobbins were uniformly arranged with two bobbins in the S direction and two bobbins in the Z direction of an 8-cord braiding machine to braid the yarn and obtain an elastic cylindrical body having a diameter of 1.8 mm. This elastic cylindrical body was stretched 2.2 times by a special-purpose braiding machine (braiding machine provided with (1) a mechanism for supplying the elastic cylindrical body as a core, (2) a mechanism for feeding the elastic cylindrical body by grasping by aligning in a FIG. 8 with the V-grooves of a series of two rollers having a plurality of v-grooves, (3) a mechanism for winding up the elastic cylindrical body by grasping by aligning in a FIG. 8 with the V-grooves of a series of two rollers having a plurality of grooves, (4) a mechanism for winding conductor wires in parallel onto the elastic cylindrical body with the elastic cylindrical body stretched, and (5) a mechanism for winding an insulating filamentous body by alternately passing through the inside and outside of conductor wires in a direction opposite of the winding direction of the conductor wires with the elastic cylindrical body stretched), while winding four prescribed conductor wires (Tatsuno Wire Co., Ltd., 2USTC: 30 μm×48 strands and 30 μm×90 strands) in parallel in the Z direction around the elastic cylindrical body at equal intervals, and winding four polyester fibers (56 dtex (12 f)) in parallel and at equal intervals by alternately passing through the inside and outside of the conductor wires to obtain elastic signal transmission cables of the present invention.

The composition and evaluation results of the resulting elastic transmission cables are shown in Table 1.

Examples 3 and 4

Using natural rubber No. 18 square rubber (Marueinissan Co., Ltd.) for the core, an outer cover was provided with a 16-cord braiding machine using wooly nylon (230 dtex (black-dyed yarn)×3 ply yarn) while stretching by a factor of 4 times to obtain an elastic cylindrical body having a diameter of 2.5 mm. Elastic signal transmission cables of the present invention were produced in the same manner as Examples 1 and 2 with the exception of using the resulting elastic cylindrical body. The composition and evaluation results of the resulting elastic signal transmission cables are also shown in Table 1.

Example 5

Using a commercially available rubber cord (bicycle luggage cord, diameter: 6 mm) as an elastic cylindrical body and using this elastic cylindrical body as a core, four conductor wires (Tatsuno Wire Co., Ltd., 2USTC: 30 μm×90 strands) were wound around the elastic cylindrical body in parallel in the Z direction at equal intervals while stretching the elastic cylindrical body by 1.4 times to obtain an elastic signal transmission cable of the present invention. The composition and evaluation results of the resulting elastic signal transmission cable are also shown in Table 1.

Example 6

Using the elastic cylindrical body obtained in Example 3 as a core, the core was double-covered with conductor wires (Tatsuno Wire Co., Ltd., 2USTC: 30 μm×90 strands) by lower twisting in the Z direction at 133 T/M and upper twisting in the Z direction at 125 T/M while stretching the core by 3 times using a double covering machine (Kataoka Machine Industrial Co., Ltd., Model SSC) to obtain an intermediate of an elastic signal transmission cable. Moreover, using this intermediate as a core, the core was double-covered with conductor wires (Tatsuno Wire Co., Ltd., 2USTC: 30 μm×90 strands) by lower twisting in the Z direction at 120 T/M and upper twisting in the Z direction at 110 T/M while stretching the core by 2.9 times using a special-purpose double covering machine (Kataoka Techno Co., Ltd., Model SP-D-400: provided with (1) a mechanism for supplying the elastic cylindrical body as a core, (2) a mechanism for feeding the elastic cylindrical body by grasping by aligning with the V-grooves of a roller having a plurality of V-grooves, (3) a mechanism for winding up the elastic cylindrical body by grasping by aligning with the V-grooves of a roller having a plurality of grooves, (4) a mechanism for winding conductor wires in parallel onto the elastic cylindrical body with the elastic cylindrical body stretched, and (5) a mechanism for winding an insulating filamentous body on the outside of the conductor wires in a direction opposite of the winding direction of the conductor wires with the elastic cylindrical body stretched) to obtain an elastic signal transmission cable of the present invention having four conductor wires wound in the Z direction. The composition and evaluation results of the resulting elastic signal transmission cable are also shown in Table 1.

Comparative Example 1

A 1 m section in the center of a commercially available USB cable (Elecom USB2-20) was cut out, and the outer coating on both ends was peeled off over a length of about 1 cm to expose four conductor wires. The same evaluations as Examples 1 to 6 were carried out using the two twisted conductor wires (green and white) of the four conductor wires as signal lines, and using the other two conductor wires (red and black) as a power line and ground line. The resulting evaluation results are also shown in Table 1.

TABLE 1

| | Composition | | | | | | | | | | |
|---|---|---|---|---|---|---|---|---|---|---|---|
| | Elastic cylindrical body | | | Conductor portion | | | | | | | |
| | | Elasticity | | | | Positional relationship of multiple conductor wires | | | Insulating filamentous body wound in opposite direction of conductor wires | | Wound state |
| | Material | 10% elasticity | 100% stretch recovery rate | Conductor wires | No. of wires | Wound direction | Directional uniformity | Parallelism | Present/absent | Winding method | Wound diameter (mm) |
| Ex. 1 | Poly-urethane | A | 95 | 2USTC/30/48 | 4 | Z | A | A | Present | Inside/outside | 1.9 |

TABLE 1-continued

| | | | | | | | | | | | |
|---|---|---|---|---|---|---|---|---|---|---|---|
| Ex. 2 | Poly-urethane | A | 95 | 2USTC/30/90 | 4 | Z | A | A | Present | Inside/outside | 2.3 |
| Ex. 3 | Natural rubber | A | 97 | 2USTC/30/90 | 4 | Z | A | A | Present | Inside/outside | 2.8 |
| Ex. 4 | Natural rubber | A | 97 | 2USTC/30/180 | 4 | Z | A | A | Present | Inside/outside | 3.0 |
| Ex. 5 | Commercially available rubber cord (very thick) | A | 98 | 2USTC 30/90 | 4 | Z | A | B | Absent | — | 6.5 |
| Ex. 6 | Natural rubber | A | 97 | 2USTC 30/90 | 4 | Z | A | C | Absent | — | 3.0 |
| Comp. Ex. 1 | Commercially available USB cable (Elecom USB-20) | | | | | | | | | | — |

| | Composition | | | Evaluation Results | | | | | | | |
|---|---|---|---|---|---|---|---|---|---|---|---|
| | Conductor portion Wound state | | | | | | | | Transmission properties | | |
| | | Proximal | | Elasticity | | | | | 250 MHz | | |
| | Pitch | conductor wire | | | 20% stretch | | 50% stretch | | transmission | USB | Electrical |
| | interval | interval (mm) | | 10% | Load | | Load | | loss | device | resistance |
| | (mm) | Avg. d | Variation r | elasticity | [cN] | Recovery | [cN] | Recovery | (dB) | operation | (Ω/m) |
| Ex. 1 | 3.0 | 0.7 | 0.05 | A | 70 | A | 152 | A | 5.3 | A | 1.32 |
| Ex. 2 | 3.3 | 0.8 | 0.07 | A | 76 | A | 165 | A | 6.0 | A | 0.71 |
| Ex. 3 | 3.2 | 0.8 | 0.1 | A | 77 | A | 123 | A | 5.6 | A | 0.86 |
| Ex. 4 | 4.7 | 1.2 | 0.3 | A | 85 | A | 132 | A | 5.6 | A | 0.35 |
| Ex. 5 | 9.0 | 2 | 2.2 | A | 1010 | A | 2450 | A | 8.0 | B | 0.73 |
| Ex. 6 | 3.2 | 0.8 | 0.5 | A | 70 | A | 120 | A | 7.5 | B | 0.92-0.98 |
| Comp. Ex. 1 | — | — | — | B | — | — | — | — | 3.0 | A | 0.22 |

As can be seen in Table 1, the elastic signal transmission cables of the present invention are revolutionary signal transmission cables that demonstrate elasticity while enabling high-speed signal transmission.

Examples 7 and 8

Elastic signal transmission cables having an outer coating comprised of insulating fiber were obtained using the special-purpose braiding machine described in Example 1, using the elastic signal transmission cables obtained in Examples 3 and 4 as cores, and winding eight wooly nylon strands (230 dtex×2 ply) in the S direction and eight strands in the Z direction while stretching by 1.8 times. The composition and evaluation results of the resulting elastic signal transmission cables are shown in Table 2.

Example 9

Four conductor wires (Tatsuno Wire Co., Ltd., 2USTC: 30 μm×90 strands) were plied and wound onto a single bobbin. The bobbin was placed in the lower level of the special-purpose double covering machine used in Example 6 (Kataoka Techno Co., Ltd., Model SP-D-400). Using the elastic cylindrical body obtained in Example 3, the four conductor wires wound onto the single bobbin were covered at 133 T/M in the Z direction while stretching the core by 3 times using the special-purpose double covering machine. Moreover, an outer coating layer was formed in the same manner as Example 7 to obtain an elastic signal transmission cable of the present invention.

The composition and evaluation results of the resulting elastic signal transmission cable are also shown in Table 2.

Example 10

Conductor wires were wound in the same manner as Example 9 followed by winding polyester fiber (167 dtex (48 f)) in the S direction at 210 T/M to restrain the conductor wires. Moreover, an outer coating layer was formed in the same manner as Example 7 to obtain an elastic signal transmission cable of the present invention. The composition and evaluation results of the resulting elastic signal transmission cable are also shown in Table 2.

Example 11

Using an elastic cylindrical body obtained in the same manner as Example 1, four strands of 690 dtex wooly nylon (230 dtex×3 ply) were arranged between each of four conductor wires (Tatsuno Wire Co., Ltd., 2USTC: 30 μm×90 strands) and wound in parallel in the Z direction while stretching the core by 2.2 times, and 8 polyester fibers (56 dtex (12 f)) were wound in the S direction while crossing to obtain an elastic signal transmission cable prior to being provided with an outer coating layer. An outer coating layer was then formed by alternately winding 8 ester wooly strands (330 dtex×2 ply) in the S direction and 8 strands in the Z direction using the special-purpose braiding machine described in Example 1 while stretching the cable by 1.8 times to obtain an elastic signal transmission cable of the present invention. The com position and evaluation results of the resulting elastic signal transmission cable are also shown in Table 2.

Comparative Example 2

Using the elastic cylindrical body obtained in Example 3 as a core, a signal transmission cable was obtained by double-covering the core with conductor wires (Tatsuno Wire Co., Ltd., 2USTC: 30 μm×90 stands) by lower twisting in the Z direction at 133 T/M and upper twisting in the S direction at 125 T/M while stretching the core by 3 times using the double covering machine described in Example 6. Moreover, while using this transmission cable as a core, the core was double-covered with conductor wires (Tatsuno Wire Co., Ltd., 2USTC: 30 μm×90 strands) by lower twisting in the Z direction at 133 T/M and upper twisting in the S direction at 125 M/T while stretching the core by 2.9 times to obtain an elastic signal transmission cable wound by four conductor wires by winding two in the S direction and two in the Z direction. The composition and evaluation results of the resulting elastic signal transmission cable are also shown in Table 2.

Comparative Example 3

Two 1870 dtex polyurethane elastic long fibers (Asahi Kasei Fibers Corp., trade name: Roica) were plied and used as a core, and the core was double-covered with conductor wires (Tatsuno Wire Co., Ltd., 2USTC: 30 μm×24 strands) by lower twisting in the Z direction at 426 T/M and upper twisting in the S direction at 370 T/M while stretching the core by 3 times using a double covering machine (Kataoka Machine Industrial Co., Ltd., Model SSC) to obtain elastic conductor wires. Using the special-purpose braiding machine described in Example 1, these four conductor wires were used as a core and 8 wooly nylon strands (230 dtex×2 ply) were wound in the S direction and 8 were wound in the Z direction while stretching the core by 1.8 times to form an outer coating layer and obtain an elastic signal transmission cable containing four conductor wires. The composition and evaluation results of the resulting elastic signal transmission cable are also shown in Table 2. Furthermore, this elastic signal transmission cable was used by bundling two each of the elastic conductor wires wound in the S/Z directions into two conductor wires.

TABLE 2

| | Composition | | | | | | | | |
|---|---|---|---|---|---|---|---|---|---|
| | Elastic cylindrical body | | | Conductor portion | | | | | |
| | | Elasticity | | | | Positional relationship of conductor wires | | | |
| | Material | 10% elasticity | 100% stretch recovery rate | Conductor wires | No. of wires | Winding direction | Directional uniformity | Parallelism | Inclusions between conductor wires |
| Ex 7 | Natural rubber | A | 98 | 2USTC 30/90 | 4 | Z | A | A | None |
| Ex 8 | | | | 2USTC 30/180 | 4 | Z | A | A | None |
| Ex 9 | | | | 2USTC 30/90 | 4 | Z | A | B | None |
| Ex 10 | | | | 2USTC 30/90 | 4 | Z | A | B | None |
| Ex 11 | | | | 2USTC 30/90 | 4 | Z | A | A | Yes |
| Co. Ex 12 | | | | 2USTC 30/90 | 4 | S/Z, S/Z | B | C | No |
| Co. Ex 13 | **) | A | 98 | USTC 30/24 | | ***) | B | C | No |

| | Composition | | | | | | | | | |
|---|---|---|---|---|---|---|---|---|---|---|
| | Conductor portion | | | | | | | Evaluation Results | | |
| | Insulating filamentous body wound in opposite direction of conductor wires | | Wound state (*) | | | | | Cable elasticity | | |
| | | | Wound | Pitch | Proximal conductor wire interval (mm) | | | | 20% stretch | |
| | Present | Winding method | diameter (mm) | interval (mm) | Avg d | Variation r | Coating Contents | 10% elasticity | Load (cN) | Recovery |
| Ex 7 | Yes | Inside outside | 2.8 | 3.2 | 0.8 | 0.1 | W/N 230 dtex × | A | 117 | A |
| Ex 8 | Yes | | 3 | 4.7 | 1.2 | 0.3 | 2, 16-cord | A | 125 | A |
| Ex 9 | No | — | 3.1 | 3.2 | 0.3 | 0.8 | | A | 122 | A |
| Ex 10 | Yes | Outside | 3 | 3.3 | 0.3 | 0.6 | | A | 127 | A |

TABLE 2-continued

| | | | | | | | | | |
|---|---|---|---|---|---|---|---|---|---|
| Ex 11 | Yes | Inside outside | 2.8 | 4 | 1 | 0.1 | A | 129 | A |
| Co. Ex 12 | No | — | 3.2 | — | — | — | A | 130 | A |
| Co. Ex 13 | No | — | — | — | — | — | A | 160 | A |

| | Evaluation Results | | | | | | | | |
|---|---|---|---|---|---|---|---|---|---|
| | Cable elasticity | | Transmission properties | | | | Repeated stretching durability | | |
| | 50% stretch | | 250 MHz | 500 MHz | USB | Electrical | | Transmission (after stretching 100,000 times) | |
| | | | | | | | | 250 MHz | USB |
| | Load (cN) | Re-covery | transmission loss (dB) | transmission loss (dB) | device operation | resistance (Ω) | Breakage | transmission loss (dB) | device operation |
| Ex 7 | 193 | A | 6.1 | 8.8 | A | 0.73 | A | 6.2 | A |
| Ex 8 | 206 | A | 6.0 | 8.5 | A | 0.35 | A | 6.0 | A |
| Ex 9 | 203 | A | 6.8 | 11.0 | B | 0.78 | B | 7.3 | B |
| Ex 10 | 210 | A | 6.5 | 10.2 | B | 0.75 | B | 6.9 | B |
| Ex 11 | 214 | A | 5.4 | 8.3 | A | 0.65 | AA | 5.4 | A |
| Co. Ex 12 | 205 | A | 17.3 | 23.0 | C | 0.79-0.89 | C | — | — |
| Co. Ex 13 | 330 | A | 11.0 | 14.0 | C | 1.55 | D | — | — |

(*) Indicates state prior to forming outer coating layer

**) Polyurethane elastic long fibers

***) Four of the above conductor wires plied after winding by S/Z onto polyurethane long fibers As can be seen in Table 2, winding an insulating filamentous body in a direction opposite that of the conductor wires improved repeated stretching durability, and more preferably, the insulating filamentous body is wound by alternately passing through the inside and outside of the conductor wires. In addition, it can also be seen that by interposing another insulating filamentous body (inclusion containing air) between the conductor wires, variations in the interval between conductor wires due to stretching can be held to a low level and durability with respect to repeated stretching can be improved.

1 m samples of the elastic signal transmission cables of Example 3, 5 and 6 were sampled and stretched by 30% followed by measurement of the interval between conductor wires. Continuing, the signal lines contained in the cable and two conductor wires adjacent to the signal lines were connected to an SMA connector, and a 50 cm portion of the middle of the cables was fixed in position after stretching by 30% (15 cm) followed by investigating transmission properties when stretched. In addition, the two signal lines contained in the cables were connected to two signal terminals of a connector for measuring differential characteristic impedance (FIG. 6), the remaining two conductor wires were bundled and connected to a ground terminal, and differential characteristic impedance was measured in a relaxed state. Those results are shown in Table 3.

TABLE 3

| | Outer | Interval | Proximal conductor wire interval | | | | Transmission properties | | | | Differential |
|---|---|---|---|---|---|---|---|---|---|---|---|
| | | | | | | | Transmission loss | | Characteristic | | |
| | diameter | pitch | Relaxed | | 30% stretching | | (250 MHz) | | impedance | | characteristic |
| | when relaxed (mm) | when relaxed (mm) | Avg. interval (d) (mm) | Variation r (mm) | Avg. interval (d') (mm) | Variation (r') (mm) | Relaxed (dB) | 30% stretching (dB) | Relaxed (Ω) | 30% stretching (Ω) | impedance Relaxed (Ω) |
| Ex. 3 | 2.8 | 3.2 | 0.8 | 0.1 | 1.0 | 0.2 | 5.6 | 6.2 | 98-105 | 93-101 | 95-105 |
| Ex. 5 | 6.5 | 9.0 | 2.0 | 2.2 | 2.6 | 2.9 | 8.0 | 9.7 | 120-250 | 95-170 | 200-400 |
| Ex. 6 | 3.0 | 3.2 | 0.8 | 0.5 | 1.0 | 0.7 | 7.5 | 8.8 | 105-145 | 75-115 | 90-110 |

According to these results, the elastic signal transmission cables of the present invention can be seen to demonstrate hardly any change in the interval between conductor wires when stretched. Moreover, changes in impedance were also low and changes in transmission loss can be seen to be less than 2 dB.

Example 12

The elastic signal transmission cable obtained in Example 3 was inserted into a synthetic rubber elastic rubber tube NPR1241-01 (Aram Corp.) and subjected to heat treatment for 10 minutes at 120° C. to form an outer coating layer and obtain an elastic signal transmission cable.

Example 13

After immersing the elastic signal transmission cable obtained in Example 7 for 5 minutes in an aqueous solution containing 5% AG7000 (Meisei Chemical Works Ltd.) and 1% isopropanol at room temperature, the cable was placed on a piece of filter paper and allowed to drain for 30 seconds followed by drying for 30 minutes in a dryer at 80° C. Continuing, the cable was subjected to heat treatment for 2 minutes in a dryer regulated at 160° C. The cable was taken out of the dryer and allowed to cool at room temperature to obtain an elastic signal transmission cable having a water-repellent outer coating layer.

Water resistance tests were carried out using the elastic signal transmission cables obtained in Examples 7, 12 and 13, and the evaluation results are shown in Table 4. Water resistance can be seen to improve considerably as a result of covering with a rubber tube. In addition, water-repellency treatment indicated that simple waterproofing effects can be obtained.

TABLE 4

| | Composition: Elastic cylindrical body – Material | Elastic cylindrical body – Elasticity | Conductor portion: Conductor wires | No. | Positional relationship of multiple conductor wires – Winding direction | Directional uniformity | Parallelism | Insulating filamentous body wound in opposite direction of conductor wires – Present | Winding method | Coating Material |
|---|---|---|---|---|---|---|---|---|---|---|
| Ex. 7 | Natural rubber | A | 2USTC 30/90 | 4 | Z | A | A | Yes | Inside/ outside | W/N 230 dtex × 2 ply, 16-cord |
| Ex. 12 | | | | | | | | | | Rubber tube |
| Ex. 13 | | | | | | | | | | W/N 230 dtex × 2 ply, 16-cord + water repellency treatment |

| | Evaluation Results: Elasticity 20% stretch – Load (cN) | Elasticity 20% stretch – Recovery | Transmission properties: 250 MHz transmission loss (dB) | 500 MHz transmission loss (dB) | USB device operation | Electrical resistance (Ω/m) | Water resistance |
|---|---|---|---|---|---|---|---|
| Ex. 7 | 117 | A | 6.1 | 8.8 | A | 0.73 | C |
| Ex. 12 | 1250 | A | 6.2 | 12.5 | B | 0.68 | A |
| Ex. 13 | 110 | A | 6.1 | 8.8 | A | 0.74 | B |

INDUSTRIAL APPLICABILITY

The elastic signal transmission cable of the present invention is preferable as signal wiring of devices having bending portions that undergo bending and stretching such as applications in the field of robots as well as devices worn on the body and devices worn on clothing, and is particularly suitable for use in humanoid robots (internal wiring and outer sheath wiring), power assist devices and wearable electronic devices. In addition, the elastic signal transmission cable of the present invention can also be preferably used in fields such as various types of robots (such as industrial robots, home robots and hobby robots), rehabilitation assistance devices, portable data measuring equipment, motion capture devices, protective wear equipped with electronic devices, video game controllers (including those worn on the body) and micro headphones.

The invention claimed is:

1. An elastic signal transmission cable having an elasticity of 10% or more and transmission loss of 10 dB/m or less in a relaxed state at 250 MHz, and comprising an elastic cylindrical body having an elasticity of 10% or more and a conductor portion containing at least two conductor wires wound in parallel in the same direction around the elastic cylindrical body, wherein a wound diameter and winding pitch of the conductor wires are 0.05 to 30 mm and 0.05 to 50 mm in a relaxed state, respectively, an interval (d) between proximal conductor wires, which is defined as an average value of distance between the centers of proximal conductor wires measured in a relaxed state at 30 arbitrary locations, is 0.01 to 20 mm, and a variation r (a difference between the maximum value and minimum value) in the interval between proximal conductor wires is such that $0 \le r \le 4d$, and wherein the conductor portion contains an insulating filamentous body alternately passing over the outside and inside (elastic cylindrical body side) of a single or plurality of conductor wires and wound in the opposite direction of the conductor wires.

2. The elastic signal transmission cable according to claim 1, wherein the elastic cylindrical body has a void therewith, an outer coating layer composed of insulating multifilament fiber containing large amount of air is formed, an average interval d' between proximal conductor wires when stretched by arbitrarily stretching to a stretch limit is within the range of ½d to 4d, and there is no deviation from this range even accompanying repeated stretching.

3. The elastic signal transmission cable according to claim 1 or 2, further having an outer coating layer composed of an insulating fiber around the outside of the conductor portion.

4. The elastic signal transmission cable according to claim 1 or 2, further having an outer coating layer composed of a resin having rubber elasticity around the outside of the conductor portion.

5. The elastic signal transmission cable according to claim 1 or 2, wherein the elastic signal transmission cable has a 20% stretch load less than 5000 cN and a 20% stretch recovery rate of 50% or more.

6. A production method of the elastic signal transmission cable according to claim 1, comprising: winding a plurality of conductor wires or a plurality of conductor wires and at least one insulating filamentous body in the same direction around the elastic cylindrical body with the elastic cylindrical body in a stretched state, and further winding at least one insulating filamentous body by alternately passing over the inside and outside (elastic cylindrical body side) of a single or a plurality of the conductor wires in the opposite direction of the conductor wires, using an apparatus that has a function for stretching the elastic cylindrical body, a function for winding a plurality of conductor wires or a plurality of conductor wires and at least one filamentous body in the same direction around the elastic cylindrical body, and a function for winding at least one filamentous body in the opposite direction of the above direction.

* * * * *